(12) United States Patent
Wang et al.

(10) Patent No.: US 7,884,663 B2
(45) Date of Patent: Feb. 8, 2011

(54) GATE-CONTROLLED RECTIFIER AND APPLICATION TO RECTIFICATION CIRCUITS THEREOF

(75) Inventors: Chih-Liang Wang, No. 131-3, Wuling St., Anle District, Keelung City 204 (TW); Ching-Sheng Yu, Wugu Township, Taipei County (TW); Po-Tai Wong, Keelung (TW)

(73) Assignees: GlacialTech, Inc., Taipei County (TW); Chih-Liang Wang, Keelung (TW)

( * ) Notice: Subject to any disclaimer, the term of this patent is extended or adjusted under 35 U.S.C. 154(b) by 0 days.

(21) Appl. No.: 12/569,298

(22) Filed: Sep. 29, 2009

(65) Prior Publication Data
US 2010/0123517 A1    May 20, 2010

(30) Foreign Application Priority Data
Nov. 4, 2008    (TW) ............................. 97142578 A (51) Int. Cl.
*H03K 17/56*    (2006.01)
(52) U.S. Cl. .................. 327/423; 327/110; 327/588
(58) Field of Classification Search .................. 327/28, 327/29, 110, 423, 424, 588
See application file for complete search history.

(56) References Cited

U.S. PATENT DOCUMENTS 7,336,508 B2 *   2/2008   Nakamura ............... 363/21.15
7,646,617 B2 *   1/2010   Thomsen ..................... 363/35

\* cited by examiner

*Primary Examiner*—Jeffrey S Zweizig
(74) *Attorney, Agent, or Firm*—Muncy, Geissler, Olds & Lowe, PLLC (57) ABSTRACT

Conventional diode rectifiers usually suffer from a higher conduction loss. The present invention discloses a gate-controlled rectifier, which comprises a line voltage polarity detection circuit, a constant voltage source, a driving circuit and a gate-controlled transistor. The line voltage polarity detection circuit detects the polarity of the line voltage and controls the driving circuit to turn on or turn off the gate-controlled transistor. The gate-controlled transistor may be a Metal Oxide Semiconductor Field Effect Transistor (MOSFET) with a gate, a source and a drain or an Insulated Gate Bipolar Transistor (IGBT) with a gate, an emitter and a collector. The constant voltage source is provided or induced by external circuits and referred to the source of the MOSFET or the emitter of the IGBT. Thanks to a lower conduction loss, this gate-controlled rectifier can be applied to rectification circuits to increase the rectification efficiency.

17 Claims, 7 Drawing Sheets

GATE-CONTROLLED RECTIFIER AND APPLICATION TO RECTIFICATION CIRCUITS THEREOF

BACKGROUND OF THE INVENTION

1. Field of the Invention

The present invention discloses a gate-controlled rectifier and applications to rectification circuits thereof for increasing the rectification efficiency.

2. Description of the Prior Art

Figure 1:
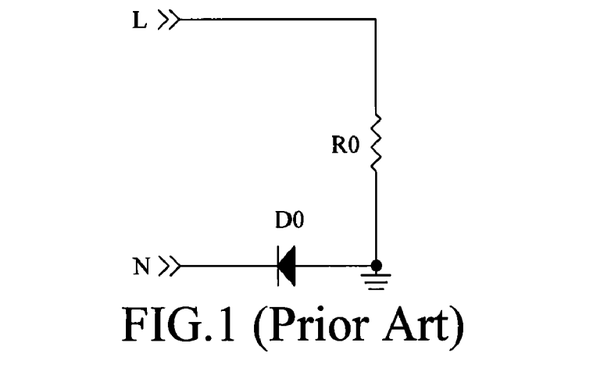
FIG. 1 is a circuit diagram illustrating a conventional half-wave rectification circuit.
Figure 2A:
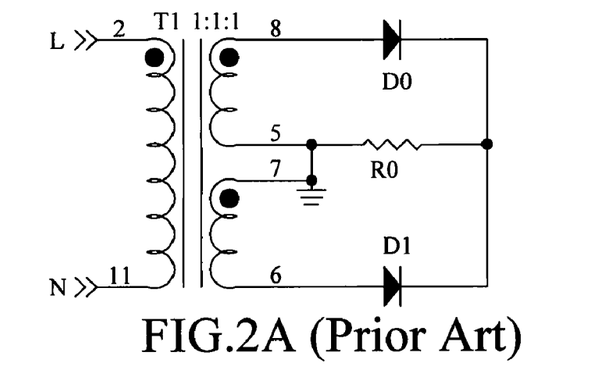
FIG. 2A, FIG. 2B, FIG. 3A and FIG. 3B are circuit diagrams illustrating conventional full-wave rectification circuits.
Figure 2B:
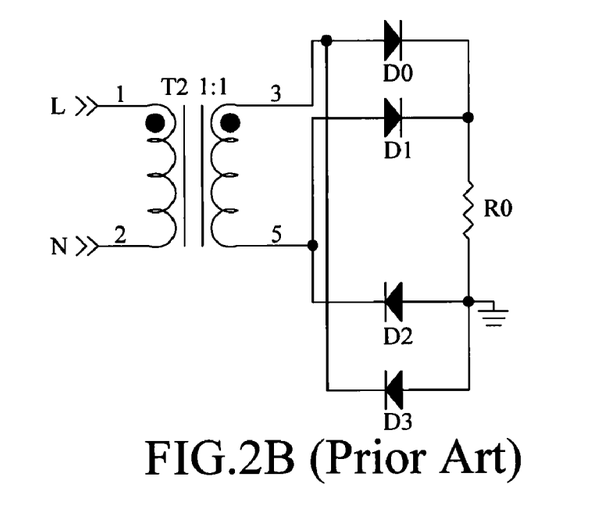
Figure 3A:
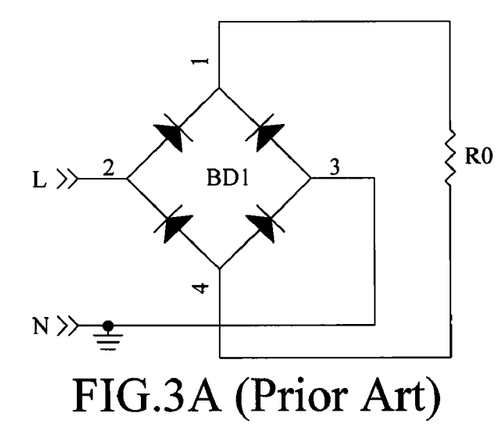
Figure 3B:
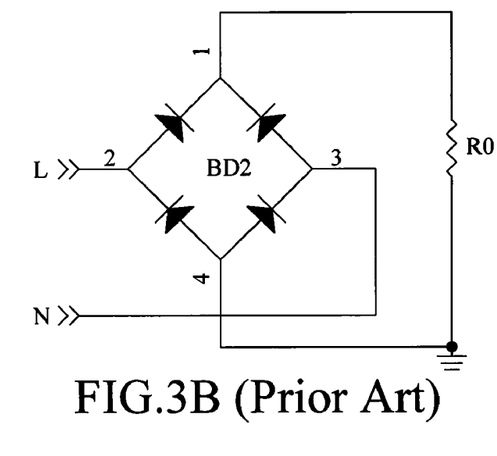
Figure 4:
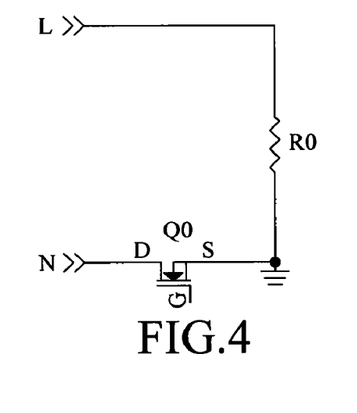
FIG. 4, FIG. 5A, FIG. 5B, FIG. 6A, FIG. 6B and FIG. 6C are circuit diagrams of NMOS rectifiers according to the present invention.
Figure 5A:
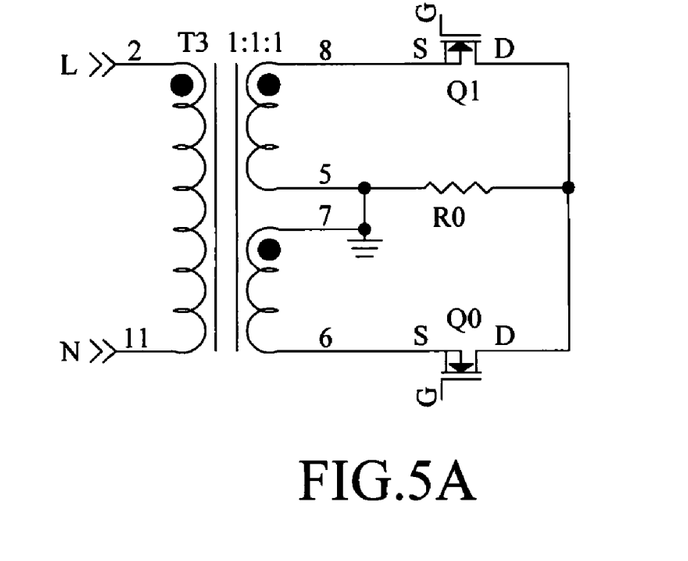
Figure 5B:
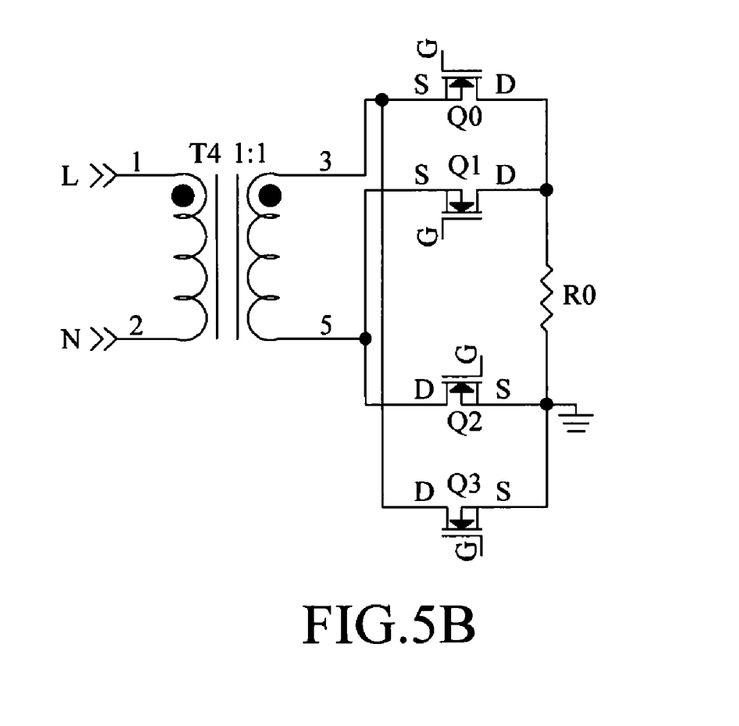

Conventional rectification circuits utilize diodes, which have a unidirectional conduction property, to rectify an AC sinusoidal voltage to a DC pulsating voltage. For example, FIG. 1 is a half-wave rectification circuit; FIG. 2A, FIG. 2B, FIG. 3A and FIG. 3B are full-wave rectification circuits; wherein L and N are respectively line and neutral; T1 and T2 are isolation transformers; D0, D1, D2 and D3 are rectification diodes; BD1 and BD2 are bridge diodes; R0's are resistive loads.

Diode rectifiers usually suffer from a higher conduction loss. The present invention discloses a gate-controlled rectifier to reduce the conduction loss and increase the rectification efficiency.

SUMMARY OF THE INVENTION

The present invention is directed to a gate-controlled rectifier comprising a line voltage polarity detection circuit, a constant voltage source, a driving circuit and a gate-controlled transistor.

The gate-controlled transistor may include a metal oxide semiconductor field effect transistor (MOSFET) or an insulated gate bipolar transistor (IGBT). If the load is resistive, the gate-controlled transistor may include a bidirectional MOSFET (BMOS), a unidirectional MOSFET (UMOS) or an IGBT. If the load is capacitive, the gate-controlled transistor must include a UMOS or an IGBT. The constant voltage source is provided or induced by external circuits and referred to the source of the MOSFET or the emitter of the IGBT. The line voltage polarity detection circuit detects the polarity of the line voltage relative to the neutral voltage and controls the driving circuit to turn on or turn off the gate-controlled transistor.

The aforementioned gate-controlled transistor may be realized using discrete components or integrated circuits and applied to rectification circuits to reduce the conduction loss and increase the rectification efficiency.

For better understanding of the present invention and advantages thereof, the following description accompanied with the attached drawings is used to illustrate the spirit of the present invention.

DESCRIPTION OF THE PREFERRED EMBODIMENT

Figure 6A:
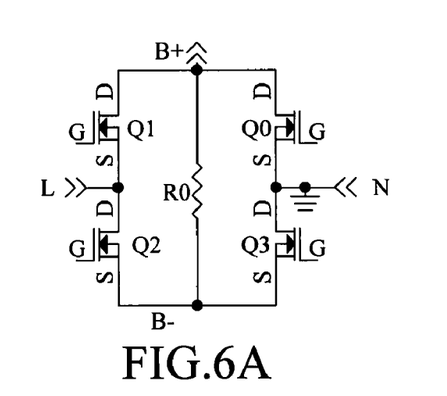
Figure 6B:
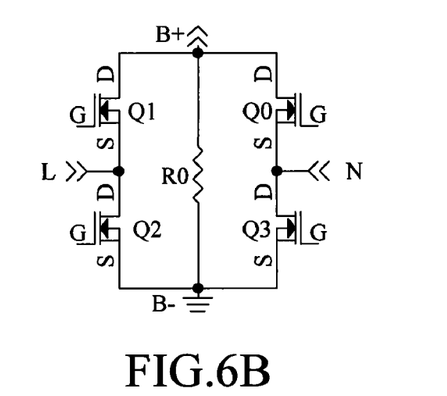
Figure 6C:
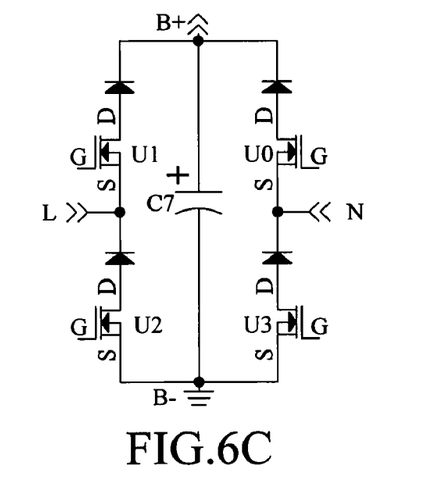

In general, conduction of a diode, a UMOS and an IGBT is unidirectional, and conduction of a BMOS (bidirectional MOSFET), such as a conventional MOSFET, is bidirectional. In FIG. 6B the load R0 is resistive, the gate-controlled transistors Q0, Q1, Q2 and Q3 may be a BMOS, a UMOS or an IGBT. In FIG. 6C the load C7 is capacitive, the gate-controlled transistors U0, U1, U2, and U3 must be a UMOS or an IGBT. A gate-controlled transistor according to the present invention may be but not limited to an NMOS. For the purpose of description, it is assumed that the gate-controlled transistor is an NMOS and the line voltage source is single-phase herein. The gate-controlled transistor is controlled by the voltage between the gate and a reference, which is the source for NMOS or the emitter for IGBT, to turn on or off the channel between the drain and the source of the MOS or the channel between the collector and the emitter of the IGBT. Here the drain and the source as well as the collector and the emitter are respectively generally called a first channel and a second channel for both types of transistors. However, for clarity, the drain and source are mainly used herein.

Replacing diodes in rectification circuits with NMOSs must satisfy two conditions: (1) The body diodes of the NMOSs should be in the same polarity orientation as the diodes, for example, the NMOSs in FIG. 4, FIG. 5A, FIG. 5B, FIG. 6A and FIG. 6B respectively correspond to the diodes in FIG. 1, FIG. 2A, FIG. 2B, FIG. 3A and FIG. 3B. (2) Each NMOS should be correctly driven by a driving structure to perform the same conduction as the diodes do. The driving structures disclosed in the present invention are illustrated in FIG. 7A, FIG. 7B, FIG. 8, FIG. 9 and FIG. 10.

It is emphatically noted that the application of the gate-controlled rectifier to rectification circuits may be but not limited to single-phase rectification circuits, as illustrated in FIG. 4, FIG. 5A, FIG. 5B, FIG. 6A, FIG. 6B and FIG. 6C, and may also be extended to two-phase or three-phase rectification circuits and so on.

Figure 7A:
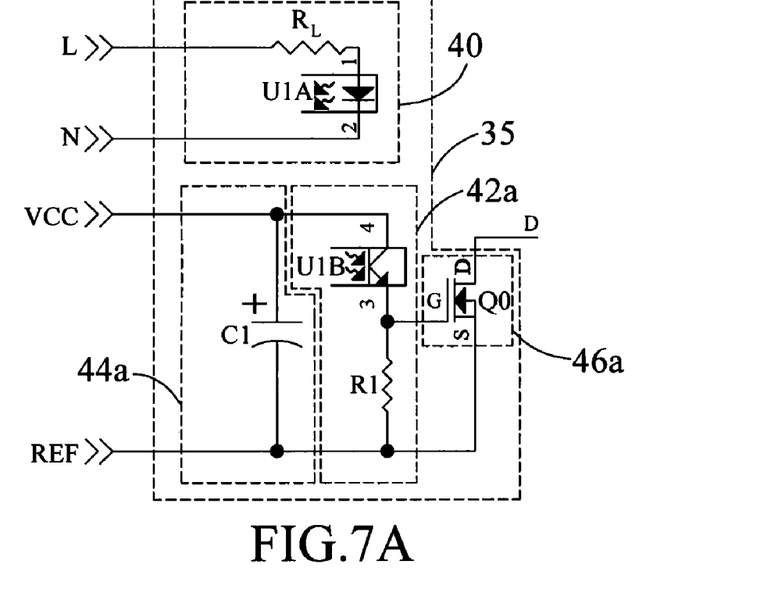
FIG. 7A and FIG. 7B are circuit diagrams of NMOS driving circuits according to the first embodiment of the present invention.

FIG. 7A is a circuit diagram illustrating a NMOS driving circuit according to the first embodiment of the present invention, wherein a NMOS rectifier 35 comprises five external pins and four internal blocks. The five external pins are a line L, a neutral N, a DC constant voltage $V_{CC}$, a reference REF and a drain D; the four internal blocks are a line voltage polarity detection circuit 40, a constant voltage source 44a, a driving circuit 42a and a gate-controlled transistor 46a. The gate-controlled transistor 46a includes a NMOS Q0 with a gate G, a source S (second channel terminal) and a drain D (first channel terminal). The constant voltage source 44a is supplied or induced by external circuits for supplying the DC constant voltage $V_{CC}$ to the driving circuit 42a. The turn-on or turn-off of the NMOS Q0 is determined by the relative potential difference between the gate G and the source S, so the DC constant voltage $V_{CC}$ should be referred to the source S of the NMOS Q0, no matter what the electric potential of the source S is. It is emphatically noted that the communication between the line voltage polarity detection circuit 40 and the driving circuit 42a may be but not limited to optic coupling, magnetic coupling and so on. For the purpose of description, all embodiments according to the present invention are realized with optic coupling. An optodiode U1A in the line voltage polarity detection circuit 40 and an optotransistor U1B in the driving circuit 42a are respectively used as an optotransmitter and an optoreceiver.

The line voltage polarity detection circuit 40 comprises a current limiting resistor $R_L$ and an optodiode U1A for detecting the polarity of the line voltage and transmitting an optic control signal to the driving circuit 42a. During positive half cycles of the line voltage, the optodiode U1A is forward-biased and then turned on such that a line current flows through and excites the optodiode U1A to emit light. During negative half cycles of the line voltage, the optodiode U1A is reverse-biased and then turned off so that the optodiode U1A does not emit light because the line current can not flow through the optodiode U1A.

The driving circuit 42a comprises an optotransistor U1B and a first resistor R1 for receiving an optic control signal transmitted by the line voltage polarity detection circuit 40 and driving the NMOS Q0. During positive half cycles of the line voltage, the optotransistor U1B is excited and turned on by the optic control signal to conduct a driving current through the first resistor R1 and generate a driving voltage between the gate and the source of the NMOS Q0 to turn on the NMOS Q0. During negative half cycles of the line voltage, the optotransistor U1B is not excited by the optic control signal and then turned off; no driving current flows through the first resistor R1, that means the voltage between the gate and the source of the NMOS Q0 is zero; the NMOS Q0 is not excited by a driving voltage and then turned off.

Figure 7B:
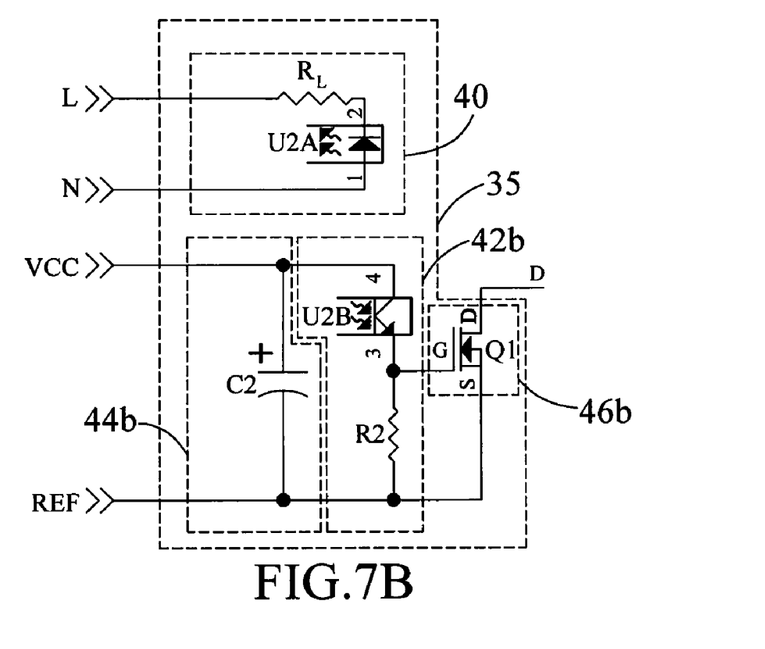

Because the optodiode U2A in FIG. 7B is in the opposite orientation to the optodiode U1A in FIG. 7A, the NMOS Q0 in FIG. 7A is turned on in positive half cycles and turned off in negative half cycles; the NMOS Q1 in FIG. 7B is turned off in positive half cycles and turned on in negative half cycles. Any rectification circuits can be constructed using these two fundamental NMOS rectifiers. For example, the D0 and D1 in FIG. 2A can be respectively replaced by the structure in FIG. 7A and FIG. 7B. The U2A may be first connected with U1A in anti-parallel, and then connected with $R_L$ in series; the constant voltage source 44a and 44b are respectively referred to the source S of the NMOS Q0 and Q1; the NMOS Q0 is driven by the driving circuit 42a and the NMOS Q1 is driven by the driving circuit 42b.

The discharging time $T_{dischg}$ of the NMOS Q0 may be approximated as:

$$T_{dischg} \approx 5R_1 C_{iSS}$$

wherein $C_{iSS}$ is the input capacitance of the NMOS Q0. The period $T_{line}$ of the line voltage can be expressed as:

$$T_{line} = 1/f_{line}$$

wherein $f_{line}$ is the line frequency. The safe operation of the NMOS Q0 should fulfill the following condition:

$$T_{dischg} \ll T_{line}$$

Figure 8:
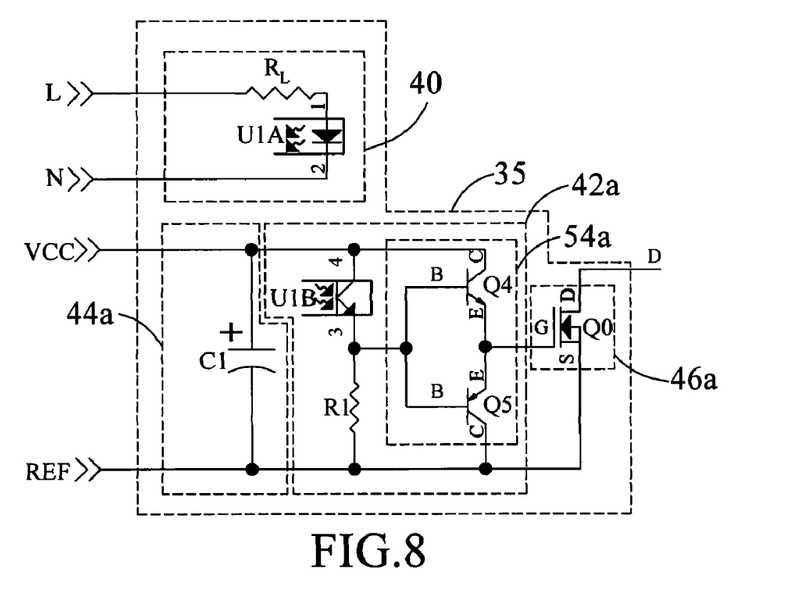
FIG. 8 is a circuit diagram of a NMOS driving circuit according to the second embodiment of the present invention.

Assume typical values to be $R_1 = 10$ kΩ and $f_{line} = 60$ Hz, then $$T_{dischg} \approx 5R_1 C_{iSS} = 0.375 \text{ ms} \ll T_{dischg} \ll T_{line} = 16.6667 \text{ ms}$$

which means that the discharging time of the NMOS Q0 is typically far shorter than the period of the line voltage. A method for shortening the turn-off time of the NMOS Q0 is illustrated in FIG. 8.

FIG. 8 is a circuit diagram illustrating a NMOS driving circuit according to the second embodiment of the present invention. In contrast to the structure in FIG. 7A, a totem-pole circuit 54a is introduced into the driving circuit 42a in FIG. 8. The totem-pole circuit 54a comprises a NPN bipolar transistor Q4 and a PNP bipolar transistor Q5, each of which has a base B, an emitter E and a collector C. The two bases B are connected to the third terminal of the optotransistor U1B; the two emitters E are connected to the gate G of the NMOS Q0; the collector C of the NPN bipolar transistor Q4 and the collector C of the PNP bipolar transistor Q5 are respectively connected to the forth terminal of the optotransistor U1B and the source S of the NMOS Q0.

During positive half cycles of the line voltage, the optotransistor U1B is excited by the optic control signal and then turned on; the driving current flows through the first resistor R1; the NPN bipolar transistor Q4 is forward-biased and then turned on by the driving voltage, while the PNP bipolar transistor Q5 is reverse-biased and then turned off by the driving voltage; the NMOS Q0 is charged via the NPN bipolar transistor Q4 and then turned on. During negative half cycles of the line voltage, the optotransistor U1B is not excited by the optic control signal and then turned off; the driving current can not flow through the first resistor R1; the PNP bipolar transistor Q5 is turned on because the gate charge previously stored on the input capacitor of the NMOS Q0 causes the PNP bipolar transistor Q5 to be forward-biased, while the NPN bipolar transistor Q4 is turned off because the base-emitter junction of the NPN bipolar transistor Q4 is reverse-biased by the forward-biased emitter-base junction of the PNP bipolar transistor Q5; the NMOS Q0 is discharged via the PNP bipolar transistor Q5 and then turned off.

The NMOS Q0 in FIG. 7A is discharged via the first resistor R1, while the NMOS Q0 in FIG. 8 is discharged via the PNP bipolar transistor Q5; therefore, the turn-off time of the NMOS Q0 in FIG. 8 is shorter than that of the NMOS Q0 in FIG. 7A. However, there are still two drawbacks of the driving voltage in FIG. 7A, FIG. 7B and FIG. 8: (1) the rising edges and falling edges are sinusoidal waves; (2) the amplitude of the plateau voltage varies with the amplitude of the line voltage. The aforementioned drawbacks are explained with FIG. 7A by taking positive half cycles of the line voltage for example. The forward current $i_F(t)$ of the optodiode U1A is expressed as:

$$i_F(t) = (v_{L-N}(t) - V_F)/R_L$$

wherein $v_{L-N}(t)$ is the sinusoidal line voltage and $V_F$ is the forward voltage drop of the optodiode U1A. The collector current $i_C(t)$ of the optotransistor U1B is expressed as:

$$i_C(t) = \eta i_F(t) = [(v_{L-N}(t)) - V_F]/R_L$$

wherein η is the current transfer ratio (CTR) of the optotransistor U1B to the optodiode U1A. The driving voltage $v_D(t)$ of the NMOS Q0 is expressed as:

$$v_D(t) = R_1 i_c(t) = \eta R_1 [(v_{L-N}(t)) - V_F]/R_L$$

According to the above equation, the driving voltage in FIG. 7A, FIG. 7B and FIG. 8, is a variable amplitude sinusoidal wave.

In general, the channel threshold voltage $V_{th}$ of an NMOS is equal to 3V. When $v_D(t) < V_{th}$, the channel of the NMOS cannot be formed; the line current cannot flow through the channel; this time is called "dead time". When $v_D(t) \geq V_{th}$, the channel may be formed; the line current may flow through the channel; this time is called "conduction time". The advantage of dead time is that it prevents cross conduction between NMOSs in the opposite phase, and its drawback is that the line current may only flow through the body diode of the NMOS during the dead time, resulting in a higher conduction loss. In the situation where there is no cross conduction, the dead time should be as short as possible to increase the rectification efficiency. As for driving a NMOS switch, a driving voltage with constant amplitude is more suitable than one with variable amplitude. Besides, a square wave has a shorter dead time than a sinusoidal wave does. Methods for generating a constant amplitude square wave are shown in FIG. 9 and FIG. 10.

Figure 9:
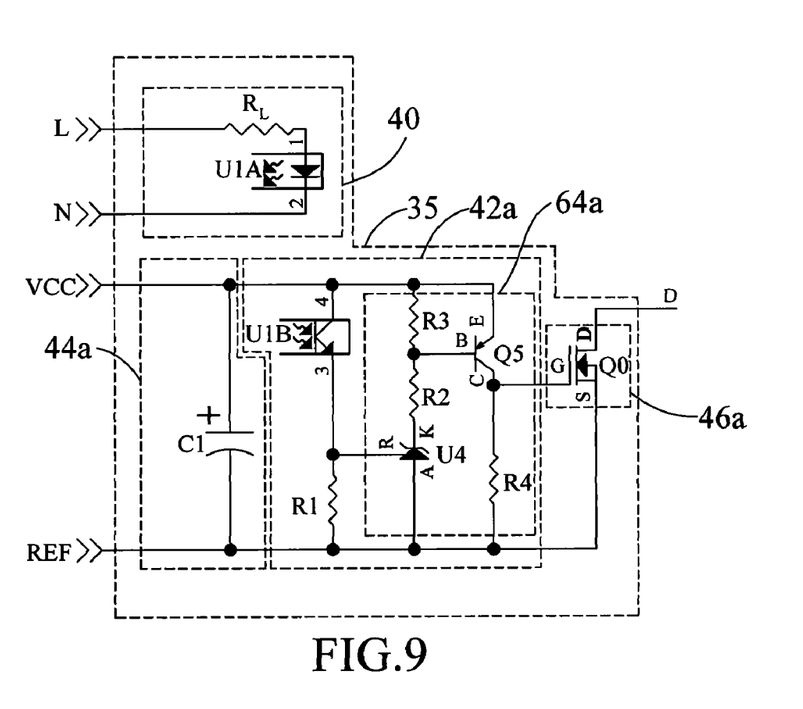
FIG. 9 is a circuit diagram of a NMOS driving circuit according to the third embodiment of the present invention.
Figure 10:
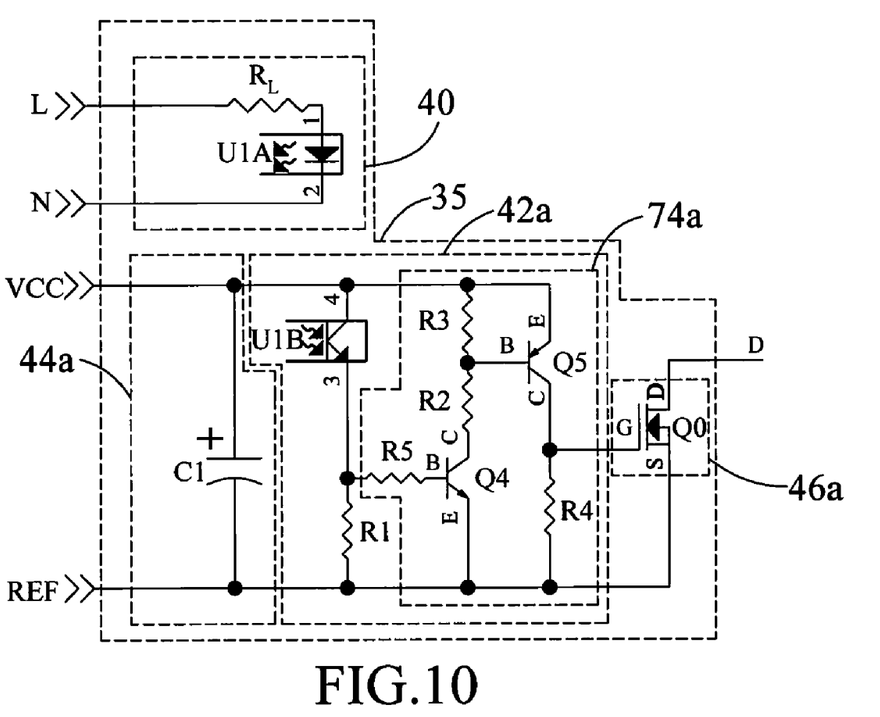
FIG. 10 is a circuit diagram of a NMOS driving circuit according to the fourth embodiment of the present invention.

FIG. 9 is a circuit diagram illustrating a NMOS driving circuit according to the third embodiment of the present invention. In contrast to FIG. 7A, a switch circuit 64a is introduced into the driving circuit 42a in FIG. 9. The switch circuit 64a comprises a threshold switch U4, a PNP bipolar transistor Q5, a second resistor R2, a third resistor R3 and a fourth resistor R4.

The threshold switch U4 is realized by a programmable regulator comprising a reference R, an anode A, a cathode K and having a threshold voltage $V_{th}$. When the voltage difference between the reference R and the anode A is lower than the threshold voltage, $v_{R-A}(t)<V_{th}$, there is no conduction between the cathode K and the anode A. When $v_{R-A}(t) \geq V_{th}$, a conducting channel is formed between the cathode K and the anode A.

During positive half cycles of the line voltage, the optotransistor U1B is excited by the optic control signal and then turned on; the driving current may flow through the first resistor R1. When $v_{R-A}(t)<V_{th}$, there is no conduction between the cathode K and the anode A; the PNP bipolar transistor Q5 is not forward-biased by the $V_{CC}$ and then turned off; the NMOS Q0 is discharged via the fourth resistor R4 and then turned off. When $v_{R-A}(t) \geq V_{th}$, a conducting channel is formed between the cathode K and the anode A; the PNP bipolar transistor Q5 is forward-biased by the $V_{CC}$ and then turned on; the NMOS Q0 is charged via the PNP bipolar transistor Q5 and then turned on. During negative half cycles of the line voltage, the optotransistor U1B is not excited by the optic control signal and then turned off; the driving current cannot flow through the first resistor R1; $v_{R-A}(t)<V_{th}$ so there is no conduction between the cathode K and the anode A; the PNP bipolar transistor Q5 is not forward-biased by the $V_{CC}$ and then turned off; the NMOS Q0 is discharged via the fourth resistor R4 and then turned off.

During positive half cycles of the line voltage and when $v_{R-A}(t) \geq V_{th}$, the PNP bipolar transistor Q5 is forward-biased by the $V_{CC}$ and then turned on; the gate-source voltage of the NMOS Q0 is $v_{GS}(t)=V_{CC}$, while in other situations, $v_{GS}(t)=0$. Accordingly, the driving voltage of the NMOS Q0 is a constant amplitude square wave. Two typical values for the threshold voltage of the programmable regulator in FIG. 9 are respectively $V_{th}=2.5V$ (for TL431) and $V_{th}=1.25V$ (for TL432). Therefore, the lower the threshold voltage is, the shorter the dead time is and the higher the rectification efficiency is. The threshold voltage can be further reduced via the driving structure in FIG. 10.

FIG. 10 is a circuit diagram illustrating the fourth embodiment of the NMOS driving circuit according to the present invention. In contrast to FIG. 7A, a switch circuit 74a is introduced into the driving circuit 42a as shown in FIG. 10. The switch circuit 74a comprises a threshold switch (a NPN bipolar transistor Q4), a PNP bipolar transistor Q5, a second resistor R2, a third resistor R3, a fourth resistor R4 and a fifth resistor R5. The threshold switch is realized by a NPN bipolar transistor Q4 with a base B, an emitter E, a collector C, and a threshold voltage $V_{th}<1.25V$. The operational principle of the circuit in FIG. 10 is the same as that in FIG. 9, so the detailed descriptions are skipped herein.

It is emphatically noted that the circuits realizing the aforementioned gate-controller rectifier may be but not limited to discrete components or integrated circuits. Besides, turning on or turning off the aforementioned gate-controlled rectifier should be equivalent to turning on or turning off a diode rectifier. If the load is resistive, the gate-controlled transistor may be a BMOS, a UMOS or an IGBT. If the load is capacitive, the gate-controlled transistor must be a UMOS or an IGBT. Detailed descriptions of the UMOS were given in U.S. patent application Ser. No. 12/554,545 and are skipped herein.

While the invention has been described in terms of what are presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A gate-controlled rectifier comprising:
   a line voltage polarity detection circuit used to detect the polarity of a line voltage;
   a gate-controlled transistor with a gate, a first channel terminal and a second channel terminal;
   a constant voltage source referred to said second channel terminal of said gate-controlled transistor; and
   a driving circuit controlled by said line voltage polarity detection circuit to determine whether a channel between said first channel terminal and said second channel terminal is formed or not.

2. The gate-controlled rectifier according to claim 1, wherein said driving circuit comprises
   an optotransistor comprising a first terminal and a second terminal, wherein said first terminal is connected to said constant voltage source; and
   a first resistor connected between said second terminal of said optotransistor and said second channel terminal of said gate-controlled rectifier.

3. The gate-controlled rectifier according to claim 2, wherein said driving circuit further comprises a totem-pole circuit comprising
   a NPN bipolar transistor with a base, an emitter and a collector; and
   a PNP bipolar transistor with a base, an emitter and a collector, wherein said base of said NPN bipolar transistor is connected to said base of said PNP bipolar transistor and then connected to a joint of said second terminal of said optotransistor and said first resistor; said emitters of said NPN bipolar transistor and said PNP bipolar transistor are connected to each other and then connected to said gate of said gate-controlled transistor; said collector of said NPN bipolar transistor is connected to said first terminal of said optotransistor; and said collector of said PNP bipolar transistor is connected to said second channel terminal of said gate-controlled rectifier.

4. The gate-controlled rectifier according to claim 3, wherein said line voltage polarity detection circuit comprises:
   a current limiting resistor; and
   an optodiode corresponding to said optotransistor and connected with said current limiting resistor in series, wherein said optodiode detects the polarity of said line voltage.

5. The gate-controlled rectifier according to claim 2, wherein said driving circuit further comprises:
- a threshold switch comprising a reference, an anode and a cathode, wherein said reference is connected to a joint of said second terminal of said optotransistor and said first resistor; and said anode is connected to said second channel terminal of said gate-controlled transistor;
- a PNP bipolar transistor comprising a base, an emitter and a collector, wherein said collector is connected with said gate of said gate-controlled transistor;
- a second resistor connected between said base of said PNP bipolar transistor and said cathode of said threshold switch;
- a third resistor connected between said emitter of said PNP bipolar transistor and said base of said PNP bipolar transistor; and
- a fourth resistor connected between said gate and said second channel terminal of said gate-controlled transistor.

6. The gate-controlled rectifier according to claim 5, wherein said line voltage polarity detection circuit comprises:
- a current limiting resistor; and
- an optodiode corresponding to said optotransistor and connected with said current limiting resistor in series, wherein said optodiode is used to detect the polarity of said line voltage.

7. The gate-controlled rectifier according to claim 2, wherein said driving circuit further comprises:
- a PNP bipolar transistor comprising a base, an emitter and a collector, wherein said collector is connected to said gate of said gate-controlled transistor;
- an NPN bipolar transistor comprising a base, an emitter and a collector, wherein said emitter is connected to said second channel terminal of said gate-controlled transistor;
- a second resistor connected between said base of said PNP bipolar transistor and said collector of said NPN bipolar transistor;
- a third resistor connected between said emitter of said PNP bipolar transistor and said base of said PNP bipolar transistor; and
- a fourth resistor connected between said gate and said second channel terminal of said gate-controlled transistor; and
- a fifth resistor connected between said second terminal of said optotransistor and said base of said NPN bipolar transistor.

8. The gate-controlled rectifier according to claim 7, wherein said line voltage polarity detection circuit comprises:
- a current limiting resistor; and
- an optodiode corresponding to said optotransistor and connected with said current limiting resistor in series, wherein said optodiode detects the polarity of said line voltage.

9. The gate-controlled rectifier according to claim 1 further comprising a resistive load connected with said gate-controlled transistor.

10. The gate-controlled rectifier according to claim 9, wherein said gate-controlled transistor comprises an n-channel metal oxide semiconductor field effect transistor, a p-channel metal oxide semiconductor field effect transistor, a unidirectional metal oxide semiconductor field effect transistor, a bidirectional metal oxide semiconductor field effect transistor or an insulated gate bipolar transistor.

11. The gate-controlled rectifier according to claim 1 further comprising a capacitive load connected with said gate-controlled transistor.

12. The gate-controlled rectifier according to claim 11, wherein said metal oxide semiconductor field effect transistor is a unidirectional metal oxide semiconductor field effect transistor.

13. The gate-controlled rectifier according to claim 1 being realized by an integrated circuit.

14. A gate-controlled rectifier comprising:
- a gate-controlled transistor comprising a gate, a first channel terminal and a second channel terminal, wherein a first resistor is connected between said gate and said second channel terminal;
- a constant voltage input referred to said second channel terminal of said gate-controlled transistor and connected to said gate of said gate-controlled transistor through a coupler switch; and
- a line voltage input, wherein a polarity of said line voltage input is utilized to drive said coupler switch to turn on or off a channel between said first channel terminal and said second channel terminal of said gate-controlled transistor.

15. The gate-controlled rectifier according to claim 14, wherein said coupler switch is an optocoupler.

16. The gate-controlled rectifier according to claim 14, wherein said coupler switch is a magnetic coupler.

17. The gate-controlled rectifier according to claim 14 being realized by an integrated circuit.

* * * * *